United States Patent
Suzuki et al.

(10) Patent No.: US 6,549,677 B1
(45) Date of Patent: Apr. 15, 2003

(54) DATA CONVERSION METHOD AND APPARATUS AND SIGNAL RECORDING AND REPRODUCTION APPARATUS UTILIZING SAME

(75) Inventors: Yoshinori Suzuki, Kanagawa (JP); Shin Todo, Kanagawa (JP); Haruo Togashi, Kanagawa (JP); Akira Sugiyama, Kanagawa (JP); Hideyuki Matsumoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/283,034

(22) Filed: Apr. 1, 1999

(30) Foreign Application Priority Data

Apr. 3, 1998 (JP) .......................................... 10-091993

(51) Int. Cl.$^7$ ................................................ G06K 9/36
(52) U.S. Cl. ..................... 382/250; 382/233; 375/240.2; 375/240.25
(58) Field of Search ................................. 382/232, 246; 348/435, 699; 375/240.2, 240.26; 386/35

(56) References Cited

U.S. PATENT DOCUMENTS

| | | | |
|---|---|---|---|
| 5,550,640 A | * 8/1996 | Tsuboi et al. | 386/35 |
| 5,940,130 A | * 8/1999 | Nilsson et al. | 348/416 |
| 6,028,636 A | * 2/2000 | Owen et al. | 348/699 |
| 6,081,295 A | * 6/2000 | Adolph et al. | 348/405 |
| 6,222,887 B1 | * 4/2001 | Nishikawa et al. | 375/240.26 |
| 6,246,438 B1 | * 6/2001 | Nishikawa et al. | 348/401 |
| 6,389,174 B1 | * 5/2002 | Liu et al. | 382/240 |

FOREIGN PATENT DOCUMENTS

| | | |
|---|---|---|
| EP | 0 551 672 | 7/1993 |
| EP | 0 600 690 | 6/1994 |
| EP | 0 673 158 | 9/1995 |
| EP | 0 690 619 | 1/1996 |
| EP | 0 765 090 | 3/1997 |
| EP | 0 786 902 | 7/1997 |
| JP | 406121297 A | * 4/1994 |
| WO | WO 97 13371 | 4/1997 |

* cited by examiner

Primary Examiner—Jingge Wu
(74) Attorney, Agent, or Firm—Frommer Lawrence & Haug LLP; William S. Frommer; Dennis M. Smid

(57) ABSTRACT

Method and apparatus for performing data conversion between first-format encoded data in which orthogonal transform coefficients are arranged in an order of DC components and AC components from a low spatial frequency order to a high spatial frequency order in each orthogonal transform block when compression encoding which includes orthogonal transform is applied to video data and second-format encoded data in which orthogonal transform coefficients are arranged in an order of DC components and AC components from a low spatial frequency order to a high spatial frequency order in each block assembly member formed of a plurality of orthogonal transform blocks when compression encoding which includes orthogonal transform is applied to video data. The second-format encoded data may be decoded to obtain orthogonal transform coefficients which may be re-arranged from a low spatial frequency order to a high spatial frequency order in each orthogonal transform block of the first format. Such orthogonal transform coefficients may be encoded to form encoded data having the first format.

18 Claims, 9 Drawing Sheets

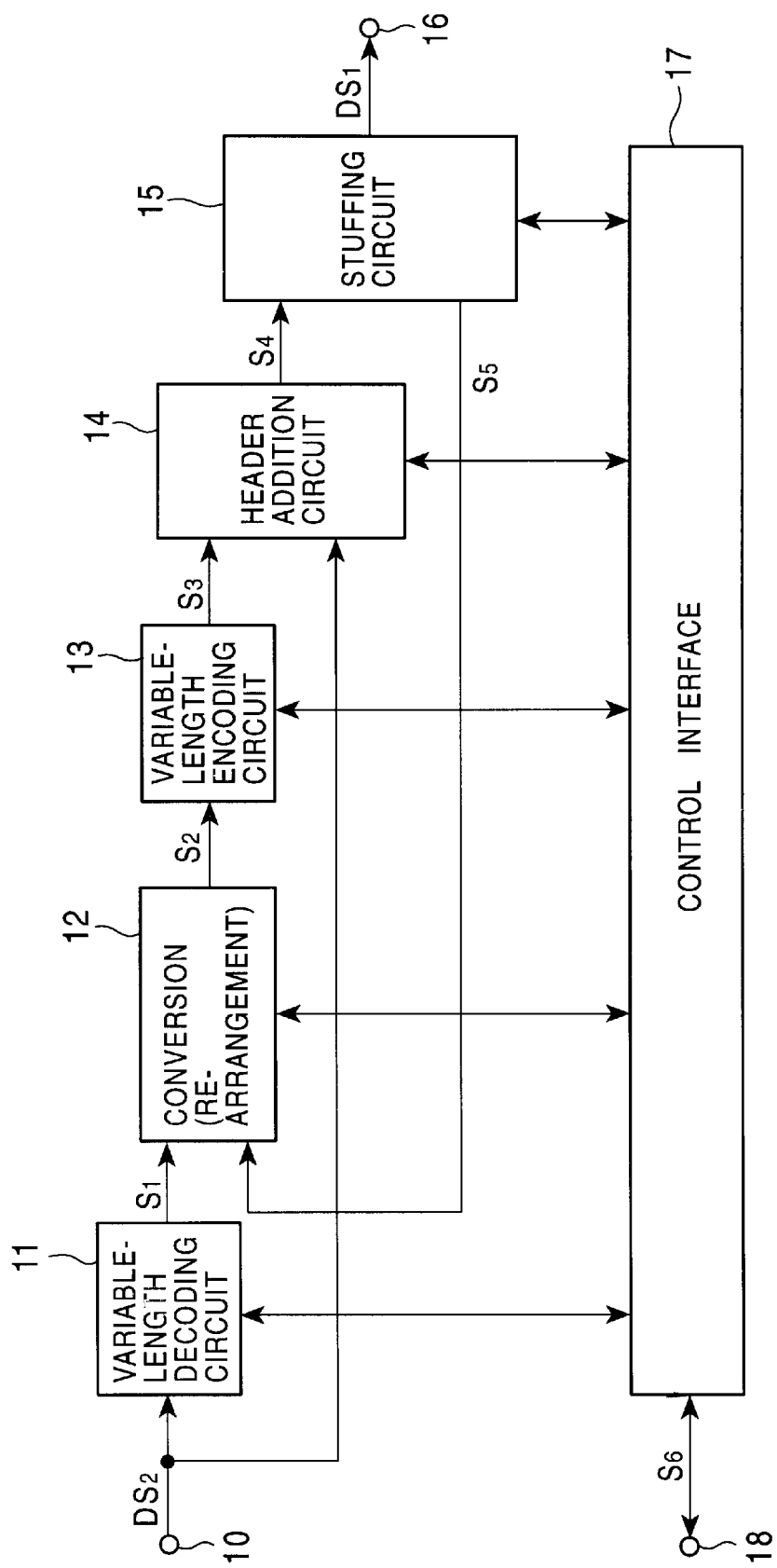

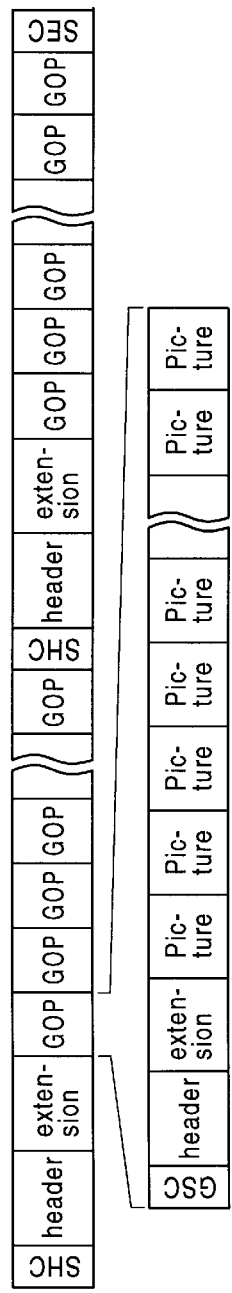
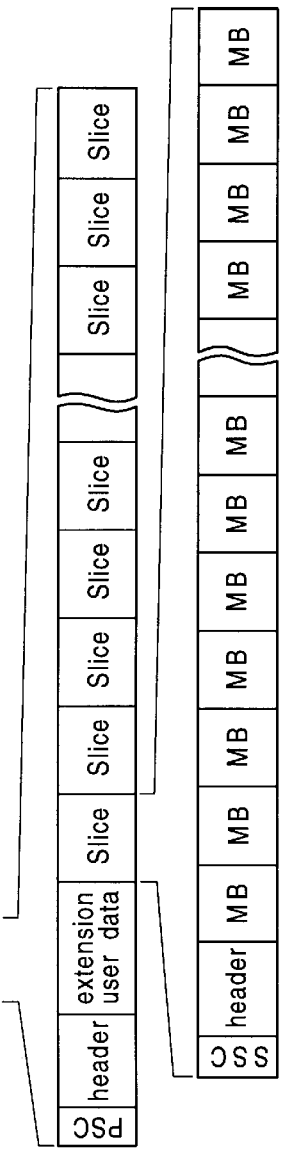
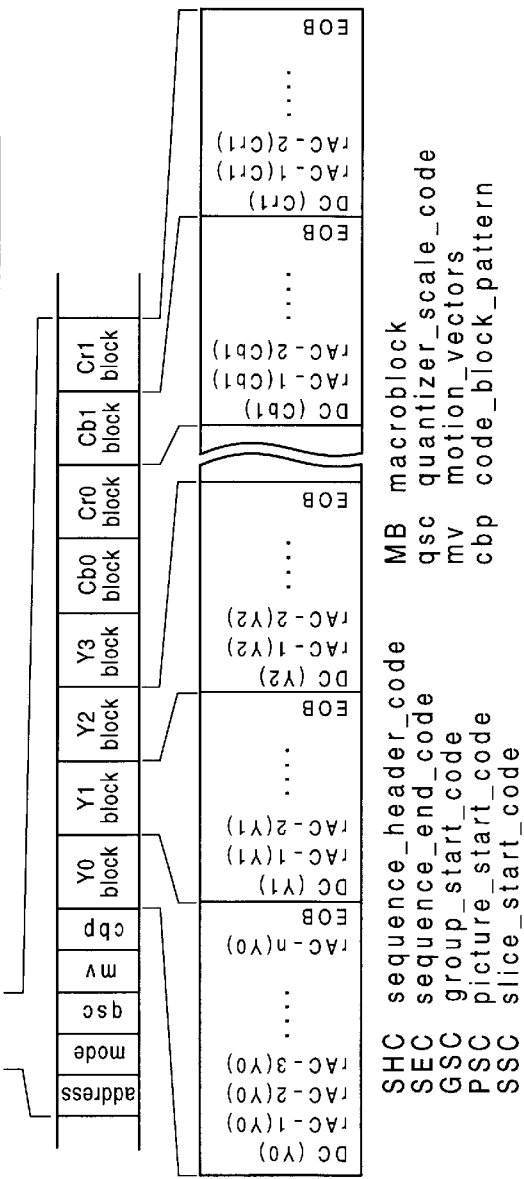
FIG. 2A SEQUENCE LAYER
FIG. 2B GOP LAYER
FIG. 2C PICTURE LAYER
FIG. 2D SLICE LAYER
FIG. 2E MB (MACROBLOCK) LAYER
FIG. 2F ENCODED DATA

ZIGZAG SCANNING

ALTERNATE SCANNING

| FIG. 5A | FIG. 5B |
|---|---|
| DC/AC-(0,0) | DC/AC-(0,0) |
| AC-(0,1) | AC-(0,1) |
| AC-(1,0) | AC-(0,2) |
| AC-(2,0) | AC-(0,3) |
| AC-(1,1) | AC-(1,0) |
| AC-(0,2) | AC-(1,1) |
| AC-(0,3) | AC-(2,0) |
| AC-(1,2) | AC-(2,1) |
| AC-(2,1) | AC-(1,2) |
| AC-(3,0) | AC-(0,4) |
| AC-(4,0) | AC-(0,5) |
| AC-(3,1) | AC-(0,6) |
| AC-(2,2) | AC-(0,7) |
| AC-(1,3) | AC-(1,3) |
| AC-(0,4) | AC-(1,4) |
| AC-(0,5) | AC-(1,5) |
| AC-(1,4) | AC-(1,6) |
| AC-(2,3) | AC-(1,7) |
| AC-(3,2) | AC-(2,2) |
| AC-(4,1) | AC-(2,3) |
| AC-(5,0) | AC-(2,4) |
| AC-(6,0) | AC-(2,5) |
| AC-(5,1) | AC-(2,6) |
| AC-(4,2) | AC-(2,7) |
| AC-(3,3) | AC-(3,0) |
| AC-(2,4) | AC-(3,1) |
| AC-(1,5) | AC-(3,2) |
| AC-(0,6) | AC-(3,3) |
| AC-(0,7) | AC-(3,4) |
| AC-(1,6) | AC-(3,5) |
| AC-(2,5) | AC-(3,6) |
| AC-(3,4) | AC-(3,7) |
| AC-(4,3) | AC-(4,0) |
| AC-(5,2) | AC-(4,1) |
| AC-(6,1) | AC-(4,2) |
| AC-(7,0) | AC-(4,3) |
| AC-(7,1) | AC-(4,4) |
| AC-(6,2) | AC-(4,5) |
| AC-(5,3) | AC-(4,6) |
| AC-(4,4) | AC-(4,7) |
| AC-(3,5) | AC-(5,0) |
| AC-(2,6) | AC-(5,1) |
| AC-(1,7) | AC-(6,0) |
| AC-(2,7) | AC-(6,1) |
| AC-(3,6) | AC-(5,2) |
| AC-(4,5) | AC-(5,3) |
| AC-(5,4) | AC-(4,4) |
| AC-(6,3) | AC-(4,5) |
| AC-(7,2) | AC-(4,6) |
| AC-(7,3) | AC-(4,7) |
| AC-(6,4) | AC-(5,4) |
| AC-(5,5) | AC-(5,5) |
| AC-(4,6) | AC-(5,6) |
| AC-(3,7) | AC-(5,7) |
| AC-(4,7) | AC-(6,2) |
| AC-(5,6) | AC-(6,3) |
| AC-(6,5) | AC-(7,0) |
| AC-(7,4) | AC-(7,1) |
| AC-(7,5) | AC-(7,2) |
| AC-(6,6) | AC-(7,3) |
| AC-(5,7) | AC-(6,4) |
| AC-(6,7) | AC-(6,5) |
| AC-(7,6) | AC-(6,6) |
| AC-(7,7) | AC-(6,7) |
|  | AC-(7,4) |
|  | AC-(7,5) |
|  | AC-(7,6) |
|  | AC-(7,7) |

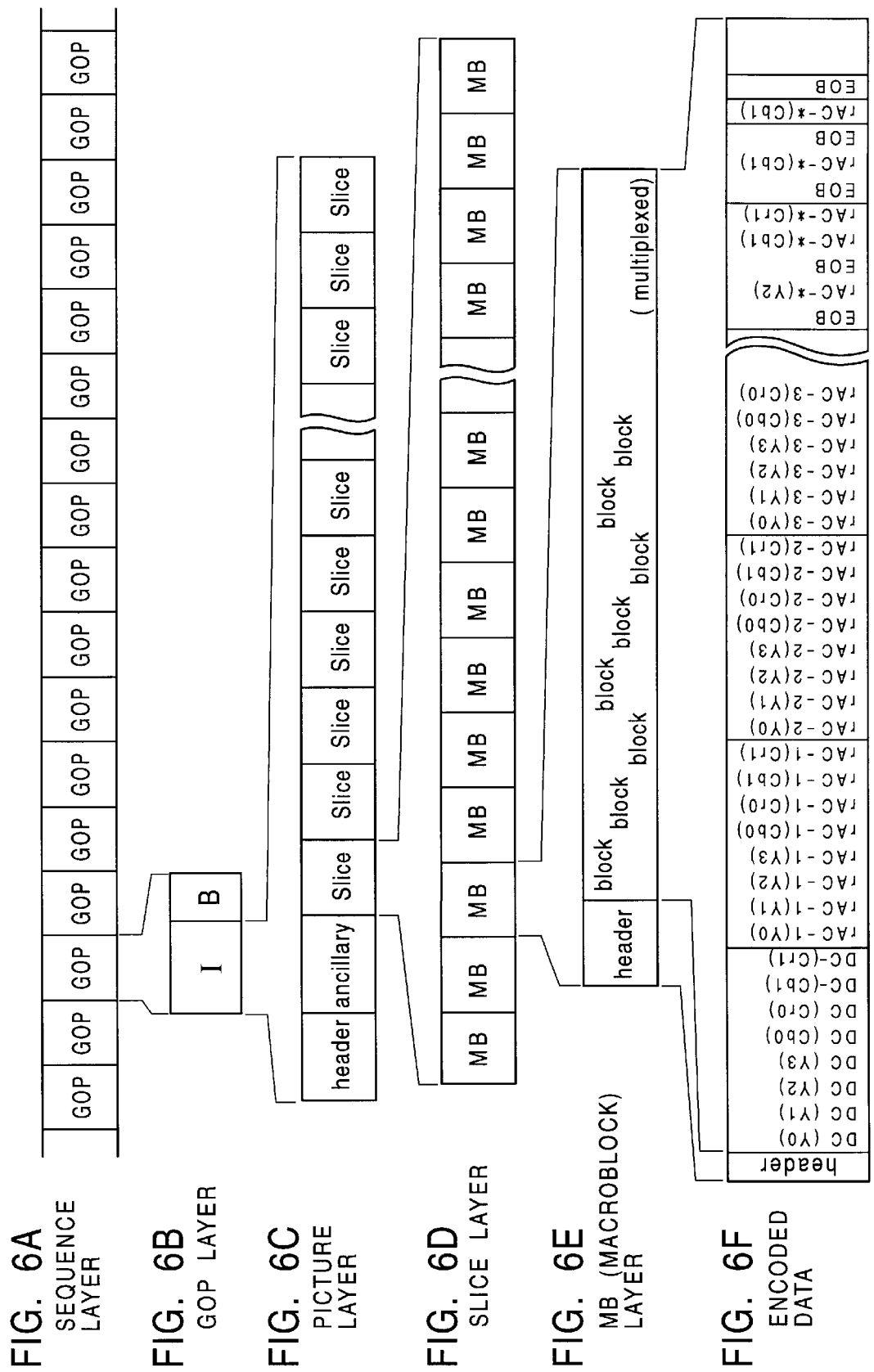

DATA CONVERSION METHOD AND APPARATUS AND SIGNAL RECORDING AND REPRODUCTION APPARATUS UTILIZING SAME

BACKGROUND OF THE INVENTION

The present invention relates to a data conversion technique, and signal recording and reproduction apparatus for format conversion of compressed encoded data and, more particularly, to a data conversion technique for data conversion between first-format encoded data in which orthogonal transform coefficients are arranged in an order of DC components and AC components from a low spatial frequency order to a high spatial frequency order in each orthogonal transform block when compression encoding which includes orthogonal transform is applied to video data and second-format encoded data in which orthogonal transform coefficients are arranged in an order of DC components and AC components from a low spatial frequency order to a high spatial frequency order in each block assembly member in which a plurality of orthogonal transform blocks are grouped when compression encoding which includes orthogonal transform is applied to video data, and to a signal recording and reproduction apparatus utilizing such data conversion technique.

Several types of formats for recording a digital video signal on a recording medium and transmitting the same may be utilized. Since a digital video signal generally has a relatively large amount of data, such signal may be subjected to compression encoding so as to enable data corresponding to a relatively long period of record/playback time to be recorded on a recording medium. An example of such compression encoding method is a so-called MPEG (Moving Picture Image Coding Experts Group) method which is discussed in ISO-IEC/JTC1/SC2/WG11 and proposed as a standard method. Such method is a hybrid method in which motion-compensation predictive coding and discrete cosine transform (DCT) coding are combined. In the MPEG method, redundancy in the time domain may be reduced by use of the difference between frames of a video signal and redundancy in the spatial domain may be reduced by the use of discrete cosine transform to efficiently encode the video signal.

In a video tape recorder (VTR) which uses a tape-type medium such as magnetic tape as a recording medium, recording may be performed such that tracks disposed at an angle to a tape running direction (so-called helical tracks) are formed with the use of a rotating head. When a tape-type recording medium having such helical tracks is reproduced at a tape running speed higher than a normal running speed, such as double or triple speed or as in a search function, the trace angle of the rotating head on the tape may be different from the angle of the recording tracks. As a result, all signals recorded in the helical tracks may not be reproduced. In other words, only a part of each helical track may be scanned (traced) in high-speed reproduction.

Therefore, if the MPEG method is used to compression encode data recovered in a tape-type recording medium and if such data is reproduced during a high speed reproduction operation (such as a search function), a high-quality reproduced image may not be obtained due to the above-described tracing of only a part of each helical track.

Accordingly, it may be desirable to have a compression encoding method for use in encoding data for recording on a tape-type recording medium which enables image reproduction to be performed somewhat effectively even in high-speed reproduction.

A recording format for a compression encoding method may be utilized in which all DC coefficients and AC coefficients of lower spatial frequency important for image reproduction in a macroblock can be read out in a high-speed reproduction (such as in a search function) by grouping the DC coefficients of all DCT blocks in the macroblock and by grouping the AC coefficients of all the DCT blocks in order of their spatial frequency and sequentially arranging them. However, such a format may be primarily intended for use with a professional broadcasting VTR or the like. In addition, it may be preferred that encoded data having a standard format, such as an MPEG standard, be used for data transmission with other units.

Further, encoded data having a format suited for VTR recording may be decoded to obtain the original non-compressed video data and compression encoding may be applied to it with a standard format such as that of MPEG. Such arrangement, however, may utilize a relatively large circuit and a relatively large amount of processing.

OBJECTS AND SUMMARY OF THE INVENTION

An object of the present invention is to provide a data conversion technique adaptable for use in a signal recording and reproduction apparatus which enables conversion from encoded data having a format suitable for VTR recording and reproduction to encoded data having a standard format such as MPEG which may be implemented in a relatively small circuit and utilize a relatively small amount of processing.

In accordance with an aspect of the present invention, a data conversion apparatus is provided for performing data conversion between first-format encoded data in which orthogonal transform coefficients are arranged in an order of DC components and AC components from a low spatial frequency order to a high spatial frequency order in each orthogonal transform block when compression encoding which includes orthogonal transform is applied to video data and second-format encoded data in which orthogonal transform coefficients are arranged in an order of DC components and AC components from a low spatial frequency order to a high spatial frequency order in each block assembly member formed of a plurality of orthogonal transform blocks when compression encoding which includes orthogonal transform is applied to video data. Such apparatus includes a decoding device for decoding the second-format encoded data to obtain orthogonal transform coefficients; a conversion device for re-arranging the orthogonal transform coefficients of the second-format data obtained by the decoding device in the order of the DC components and AC components from a low spatial frequency order to a high spatial frequency order in each orthogonal transform block of the first format; and an encoding device for encoding the orthogonal transform coefficients from the conversion device to form encoded data having the first format.

The data conversion apparatus may be formed such that the orthogonal transform is discrete cosine transform (DCT), the orthogonal transform block is a DCT block, and the block assembly member is a macroblock. The data conversion apparatus may further be formed such that the decoding device is a variable-length decoding device, and the encoding device is a variable-length encoding device.

According to another aspect of the present invention, a signal recording and reproduction apparatus is provided for recording and reproducing into and from a recording medium encoded data having a second format in which orthogonal transform coefficients are arranged in an order of DC components and AC components from a low spatial frequency order to a high spatial frequency order in each block assembly member formed of a plurality of orthogonal transform blocks when compression encoding which includes orthogonal transform is applied to video data. Such apparatus includes a decoding device for decoding the encoded data having the second format reproduced from the recording medium to obtain orthogonal transform coefficients; a conversion device for re-arranging the orthogonal transform coefficients of the second-format data obtained by the decoding device to the coefficient arrangement order of a first format in which the coefficients are arranged in the order of the DC components and AC components from a low spatial frequency order to a high spatial frequency order in each orthogonal transform block; and an encoding device for encoding the orthogonal transform coefficients from the conversion device to form encoded data having the first format.

Partial decoding may be applied to obtain orthogonal transform coefficients, the orthogonal transform coefficients may be re-arranged without applying reverse orthogonal transform, and partial encoding corresponding to the partial decoding may be applied. With the use of only these operations, encoded data having the second format can be converted to encoded data having the first format.

Other objects, features and advantages according to the present invention will become apparent from the following detailed description of illustrated embodiments when read in conjunction with the accompanying drawings in which corresponding components are identified by the same reference numerals.

BRIEF DESCRIPTION OF THE DRAWINGS

FIG. 1 is a diagram of a data conversion apparatus according to an embodiment of the present invention;

FIGS. 2A–2F are diagrams to which reference will be made in explaining a hierarchical structure of a data stream having a first format;

FIGS. 5A and 5B illustrate DCT coefficient data strings to which zigzag scanning and alternate scanning have been respectively applied;

FIGS. 6A–6F are diagrams to which reference will be made in explaining a hierarchical structure of a data stream having a second format;

DETAILED DESCRIPTION OF PREFERRED EMBODIMENTS

Figure 3:
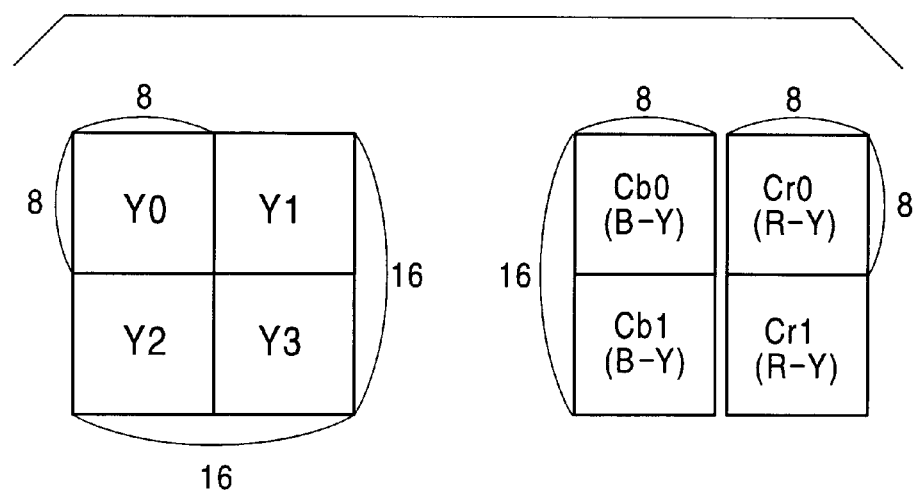
FIGS. 3A and 3B are diagrams of a macroblock.

An embodiment of the present invention will now be described with reference to the accompanying drawings.

FIG. 1 illustrates a data conversion apparatus 1 according to an embodiment of the present invention. Such apparatus may include a variable-length decoding circuit 11, a conversion circuit 12, a variable length encoding circuit 13, a header addition circuit 14, a stuffing circuit 15, and a control interface 17 which may be arranged as shown in FIG. 1.

The data conversion apparatus 1 may perform data conversion between first-format encoded data in which DC and AC components of orthogonal transform coefficients (such as DCT coefficients) are arranged in an order from a low spatial frequency to a high spatial frequency in each orthogonal transform block (such as DCT block) when compression encoding including orthogonal transform processing (such as DCT processing) is applied to video data, and second-format encoded data in which DC and AC components of orthogonal transform coefficients are arranged in an order from a low spatial frequency to a high spatial frequency in each block assembly member (such as a macroblock) in which a plurality of orthogonal transform blocks are grouped when compression encoding including orthogonal transform is applied to video data. A MPEG standard, such as a format conforming to a 4:2:2P@ML (4:2:2 profile@(main level) standard of MPEG 2, may be used as the first format, and a format in which the coefficients of DC components in each DCT block are grouped and the coefficients of AC components are grouped from a low order to a higher low in a macroblock and encoded may be used as the second format.

In the data conversion apparatus 1 of FIG. 1, a data stream $DS_2$ of encoded data having the second format is inputted to an input terminal 10 and supplied to variable-length decoding circuit 11, which may function as a decoding means for partially decoding the data so as to obtain the orthogonal transform coefficients (such as DCT coefficients), and a header addition circuit 14. The inputted data stream having the DCT coefficients may have been subjected to variable length coding (VLC) prior to being supplied to terminal 10. The variable-length decoding circuit 11 decodes a data section of the variable length coded data to set forth data delimitation(s) and supplies an output signal $S_1$ to conversion circuit 12.

The conversion circuit 12 modifies or re-arranges the data arrangement, which is a difference between the second format and the first format. For example, when a control signal $S_5$ supplied from the stuffing circuit 15 is "1," the conversion circuit 12 changes non-zero and highest spatial frequency coefficients of the AC coefficients to zero and outputs an output signal $S_2$.

The variable-length encoding circuit 13 receives the signal $S_2$ from the conversion circuit 12, applies variable length coding again to data which may need variable length coding, and outputs an output signal $S_3$.

The header addition circuit 14 detects input-data timing of the data stream $DS_2$ of the second-format input encoded data and prepares various types of header information specified in the first format, which may be MPEG2. The circuit 14 adds the prepared header information to the signal $S_3$ from the variable-length encoding circuit 13 and outputs an output signal $S_4$.

The stuffing circuit 15 may receive the signal $S_4$ having the header, calculate a data length in units of GOPs (group of pictures), insert a stuffing bit ("0") if necessary to smooth the data length of GOPs, and outputs a data stream $DS_1$ having the first format (MPEG2) to an output terminal 16. Further, if the data length in units of GOPs exceeds a specified data length, the stuffing circuit 15 may supply control signal $S_5$ set to "1" to the conversion circuit 12. As a result, the higher-spatial frequency and non-zero coefficients of the DCT coefficients are changed to zero, thereby increasing the variable length coding efficiency and performing a simple data-rate reduction.

The control interface 17 may control operations of the circuits 11 to 15, such as performing initial settings thereof, and may receive information from such circuit regarding internal operations. Further, the control interface 17 may communicate with an external CPU by use of a system-controller interface signal $S_6$ through terminal 18 so as to perform the initial settings for circuits 11 to 15 and to inform the external CPU of the internal operation conditions.

An example of the first format and an example of the second format will now be described below with reference to FIGS. 2 to 6.

FIG. 2 illustrates a hierarchical structure of a MPEG standard, such as the 4:2:2P@ML (4:2:2 profile@main level) standard of MPEG2, which may be the first format.

As shown in FIG. 2A, a sequence layer may include a number of sets each having a sequence header code (SHC: sequence_header_code), a header section, an extension section, and a number of GOPs (groups of pictures). At the end of the sets or sequence, a sequence end code (SEC: sequence_end_code) may be disposed.

As shown in a GOP layer of FIG. 2(B), a GOP from FIG. 2A may include a group start code (GSC: group_start_code) at the top, a header section, an extension section, and a number of pictures. A picture can be an intra-frame encoded image (I picture: intra picture), a forward predictive encoded image (P picture: predictive picture), or a bidirectionally predictive encoded image (B picture: bidirectionally predictive picture). These I, P, and B pictures may be disposed in a predetermined order to form a GOP.

As shown in a picture layer of FIG. 2(C), a picture from FIG. 2B may include a picture start code (PSC: picture_start_code), a header section, an extension user data section, and a number of slices.

As shown in a slice layer of FIG. 2(D), a slice of FIG. 2C may include a slice start code (SSC: slice_start_code), header section, and a number of macroblocks (MB: macroblock).

As shown in a MB (macroblock) layer of FIG. 2(E), a macroblock MB of FIG. 2d may include an address, a mode, a quantizer scale code (qsc: quantizer_scale_code), a motion vector (mv: motion_vector), a code block pattern (cbp: coded_block_pattern), and a predetermined number of blocks. A block may be formed of eight by eight DCT coefficients obtained by applying DCT (discrete cosine transform) to a DCT block of eight by eight pixels. In 4:2:2profile@main level, one macroblock MB may be formed of eight DCT blocks, that is, four luminance-signal blocks Y0, Y1, Y2, and Y3, and two types of two color-difference-signal blocks Cb0 and Cb1, and Cr0 and Cr1.

Figure 4A:
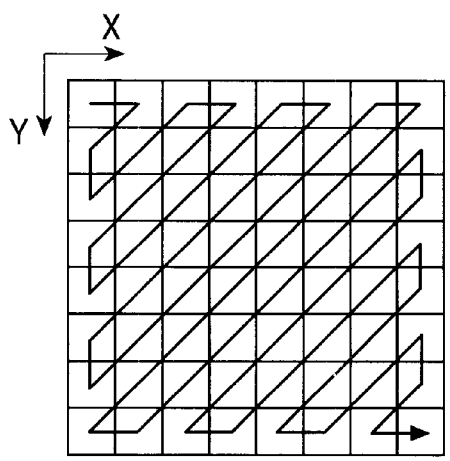
FIGS. 4A and 4B are diagrams to which reference will be made in explaining zigzag scanning and alternate scanning for DCT coefficients in a DCT block.
Figure 4B:
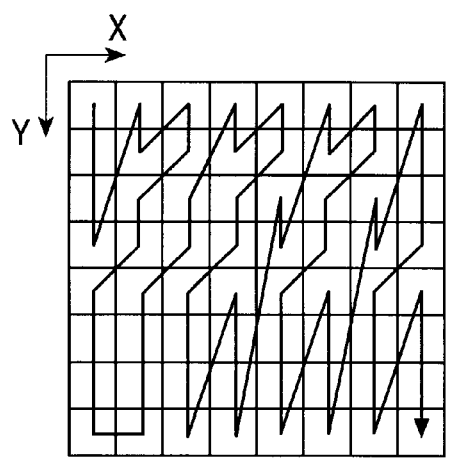

The eight by eight DCT coefficients in one DCT block may be arranged such that a DC component is disposed at the upper left corner and AC components are disposed in an order from a low spatial frequency to a high spatial frequency, in the direction from the upper left to the lower right as shown in FIG. 4A. A so-called zigzag scanning method may be utilized in which the DCT coefficients in this block are taken out in the order shown in FIG. 4A and variable length coding is applied. In addition to zigzag scanning, a so-called alternate scanning method as shown in FIG. 4B may be utilized. Either zigzag scanning or alternate scanning can be switched and used in units of pictures. The alternate scanning method is suited for encoding of an interlaced image since interlaced components can be efficiently taken out.

FIG. 5A and FIG. 5B are examples of DCT coefficients arranged in one-dimensional coefficient strings by the above-mentioned scanning methods. That is, FIG. 5A illustrates a one-dimensional coefficient string obtained by zigzag-scanning a DCT block having an eight by eight two-dimensional arrangement of DCT coefficients, and FIG. 5B illustrates a one-dimensional coefficient string obtained by alternate scanning.

FIG. 2(F) illustrates an encoded data string obtained by applying variable-length or entropy encoding (such as Huffman coding) to a one-dimensional DCT coefficient string obtained for each DCT block. Encoded data may be represented by rAC-1[y0] and so forth as shown in FIG. 2(F). In variable length encoding, a code rAC** may be determined by a zero-run length and a no-zero level.

An encoded data stream having the first format corresponding to a MPEG standard (such as a format of 4:2:2P@ML of MPEG2) has been described.

The second format corresponding to the above first format may have a hierarchical structure as shown in FIG. 6.

In the format shown in FIG. 6, one GOP in a GOP string of a sequence layer shown in FIG. 6(A) may include two frames, that is, an I picture and a B picture as shown in a GOP layer of FIG. 6(B). This structure may correspond to a second format for use with a video tape recorder. The second format itself may have a GOP with up to 30 frames, including I, P, and B pictures. When the second format is used with a video tape recorder, stuffing may be performed so to perform a recording operation on a tape with a GOP having a constant length.

A picture layer shown in FIG. 6(C) and a slice layer shown in FIG. 6(D) may conform somewhat to the MPEG standard described with reference to FIG. 2, as well as the sequence layer shown in FIG. 6(A) and the GOP layer shown in FIG. 6(B). Since such layers may not have header information, various types of header information may be added to the second format when it is converted to the first format.

The order in which DCT coefficients are arranged in a macroblock MB layer, such as that shown in FIG. 6(F), may be different from that of the MPEG format shown in FIG. 2(F). That is, as shown in the encoded data of FIG. 6(F), the DC components of the eight DCT blocks Y0 to Cr1 may be respectively arranged first, and then the AC components of the DCT coefficients corresponding to frequencies in the DCT blocks may be sequentially arranged in units of eight coefficients from a low spatial frequency to a high spatial frequency. As a result, in the macroblock MB, DC components and low spatial frequency AC components, which may be important in image reproduction, are closely arranged.

Advantages of the above-described arrangement of DCT coefficients will be described below with reference to FIGS. 7A and 7B and FIGS. 8A and 8B.

When encoded data having the first and second formats described above is recorded in slanted helical tracks on a video tape with the use of a rotating head and reproduced at a relatively high speed, since the slanted angle of a head trace may differ from the slanted angle of the helical tracks (which serve as recording tracks), only a part of the data on the helical tracks may be reproduced. Even if error correction is applied, only a part of a macroblock MB may be effectively reproduced and the remainder may not be reproduced and, as such, may be considered as an error.

Figure 7A:
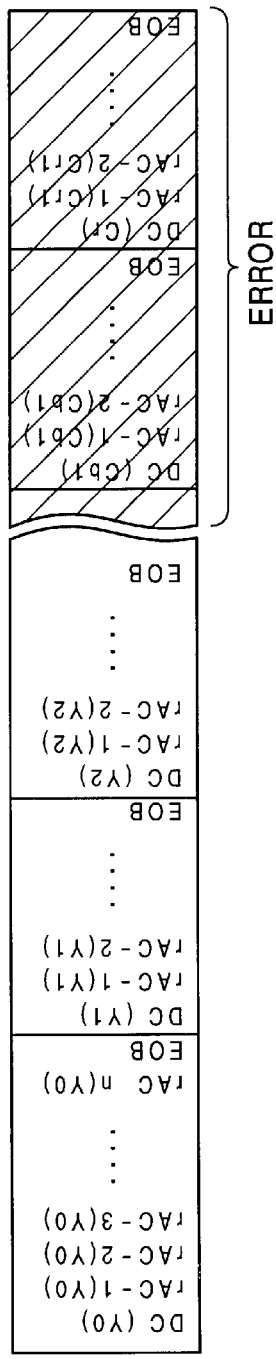
FIGS. 7A and 7B are diagrams to which reference will be made in explaining an error condition in a coefficient data string having the first format.
Figure 7B:
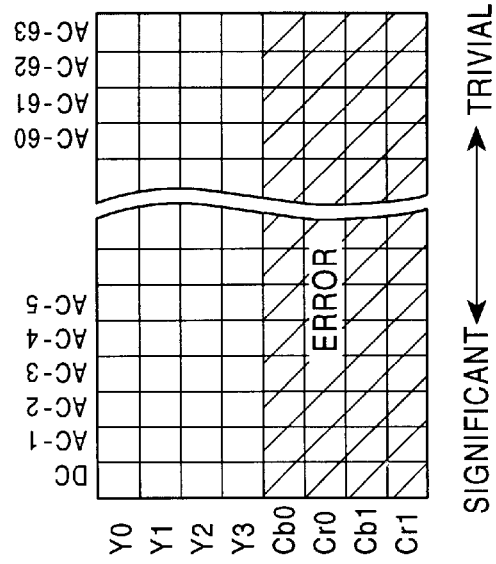

FIGS. 7A and 7B illustrate a situation in which data recorded on a video tape with MPEG2 format (described above as an example of the first format) is reproduced at a relatively high speed. Hatched portions indicate error areas wherein correction may not be possible. FIG. 7A illustrates a one-dimensional arrangement of DCT coefficients of the encoded data in a macroblock. FIG. 7B illustrates a two-dimensional arrangement of the DCT coefficients obtained by decoding the encoded data, in which the horizontal axis indicates the spatial frequency and the vertical axis indicates the DCT block. In the example shown in FIG. 7B, since the DCT blocks Y0, Y1, Y2, and Y3 of the luminance signals Y may be effectively reproduced and the DCT blocks Cb0, Cr0, Cb1, and Cr1 of the color-difference signals may be considered erroneous or may not be effectively reproduced, video without color components may be obtained. If the color-difference signal Cb0 is effectively reproduced, an unusual color may be obtained. When the luminance signal Y3 becomes erroneous, a part of the DCT blocks in the macroblock becomes lacking. Such a reproduced image is unsightly and not preferred.

Figure 8A:
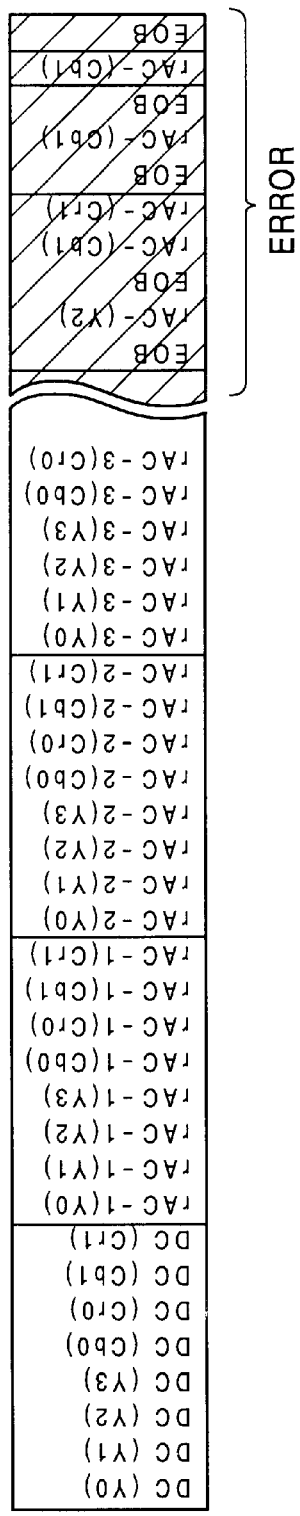
FIGS. 8A and 8B are diagrams to which reference will be made in explaining an error condition in a coefficient data string having the second format.
Figure 8B:
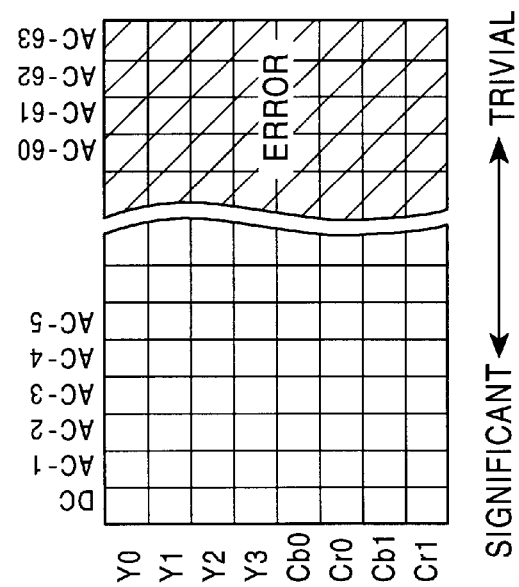

On the other hand, when data recorded on a video tape with the second format is reproduced at a relatively high speed, a hatched portion in a one-dimensional arrangement shown in FIG. 8A may be considered erroneous or may not be effectively reproduced. As shown in FIG. 8B, DC components and low-frequency AC components important for image reproduction may be effectively reproduced for all DCT blocks in the macroblock. As a result, a fairly acceptable reproduced image may be obtained.

In high-speed reproduction, an error may occur at a different position in each macroblock. If DC components and low-frequency AC components are not effectively obtained in a macroblock, an effective image for a previous frame may be displayed instead of using the data of that macroblock. The displayed image may be partially updated in units of macroblocks, and may not provide an unacceptable image to a viewer.

In the second format, the zigzag scanning and the alternate scanning, shown in FIGS. 4A and 4B and FIGS. 5A and 5B, can be switched in units of macroblocks so as to improve image quality. Specifically, it may be advantageous to use frame DCT and zigzag scanning in combination for a frame image (sequentially scanned image) having a small motion, and to use field DCT and alternate scanning in combination for an interlaced image having a large motion. In the second format, by enabling these combinations to be switched in units of macroblocks, more precise adjustment may be performed and image quality may be improved.

On the other hand, in the first format (MPEG2), only one scanning type may be used in a picture as described above. In other words, the DCT type may be switched between field DCT and frame DCT in units of macroblocks, but the scanning type may not be changed in units of macroblocks.

When the scanning type is switched in units of macroblocks in the second format, the conversion circuit 12 of FIG. 1 may re-arrange DCT coefficients so that the scanning type used in a picture matches that of the first format.

Processing for converting encoded data having the above-described second format to encoded data having the above-described first format (MPEG) will now be described with reference to FIGS. 9A to 9D.

Figure 9A:
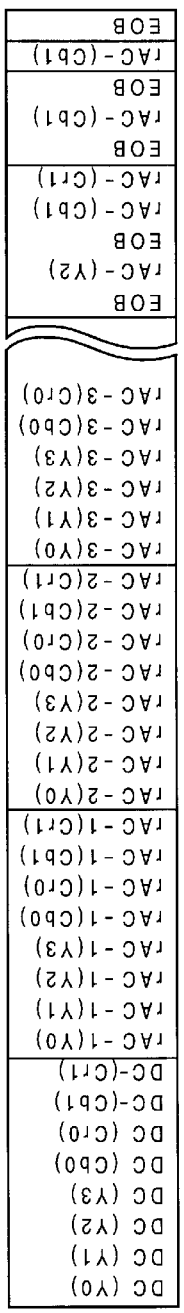
FIGS. 9A to 9D are diagrams to which reference will be made in describing an operation of the data conversion apparatus of FIG. 1.
Figure 9B:
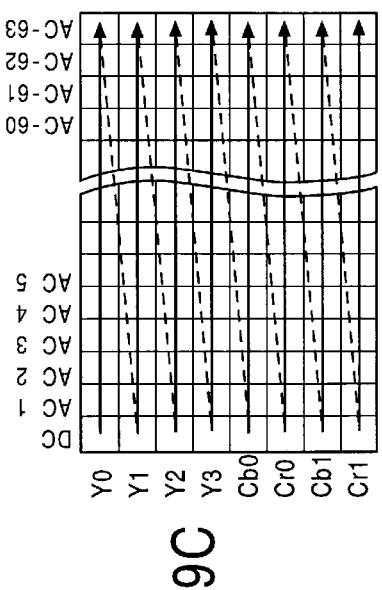
Figure 9C:
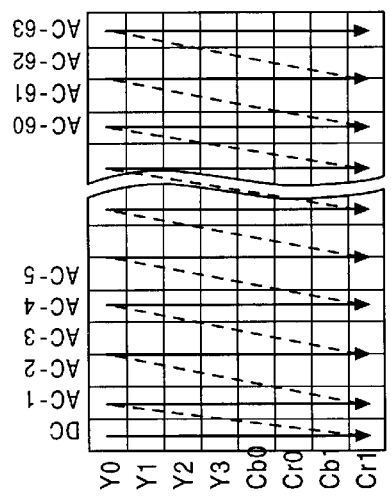
Figure 9D:
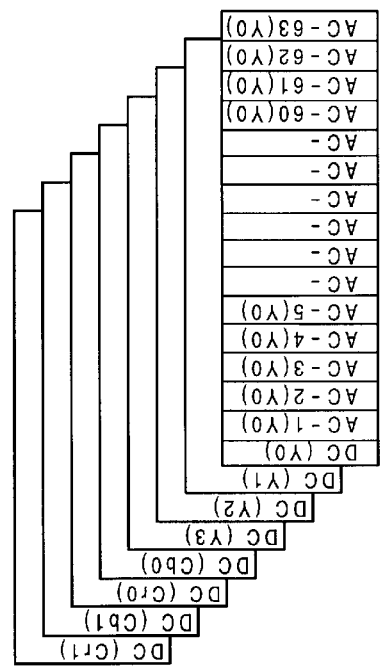

FIG. 9A illustrates a one-dimensional arrangement of encoded data of DCT coefficients of a macroblock in an encoded data stream having the second format. The variable-length decoding circuit 11 (FIG. 1) may detect the first encoded data DC[Y0] in this macroblock to make data delimitation clear. The encoded data may be written into a memory of the variable-length decoding circuit 11 in the order indicated by the arrows in FIG. 9B from the first encoded data DC[Y0]. FIG. 9B shows that, for example, encoded AC coefficient data AC-2 and AC-3 may be at the same time stored in the memory when a DCT block including the coefficient AC-2 and a DCT block including the coefficient AC-3 are derived by tracing the helical track. The coefficient data stored in the memory of the variable-length decoding circuit 11 may be variable-length decoded or converted to the order of the first format (MPEG) by reading DC components and AC components in the order from a low spatial frequency to a high spatial frequency (such as shown in FIG. 9C) in each DCT block. When the scanning type (zigzag scanning or alternate scanning) is switched in units of macroblocks in the second format, the DCT coefficients may be re-arranged so that the scanning type used in a picture matches that of the first format (MPEG). Such processing may correspond to that performed in the conversion circuit 12 of FIG. 1. The variable-length encoding circuit 13 (FIG. 1) may apply variable-length encoding to the data to obtain encoded DCT coefficient data such as shown in FIG. 9D. This data corresponds in one dimension to the encoded data shown in FIG. 2(F).

An example of an apparatus in which the above-described data conversion circuit is applied to or combined with a helical scanning type video tape recorder (VTR) so as to form a signal recording and reproduction apparatus for recording in the second format will now be described with reference to FIG. 10.

Figure 10:
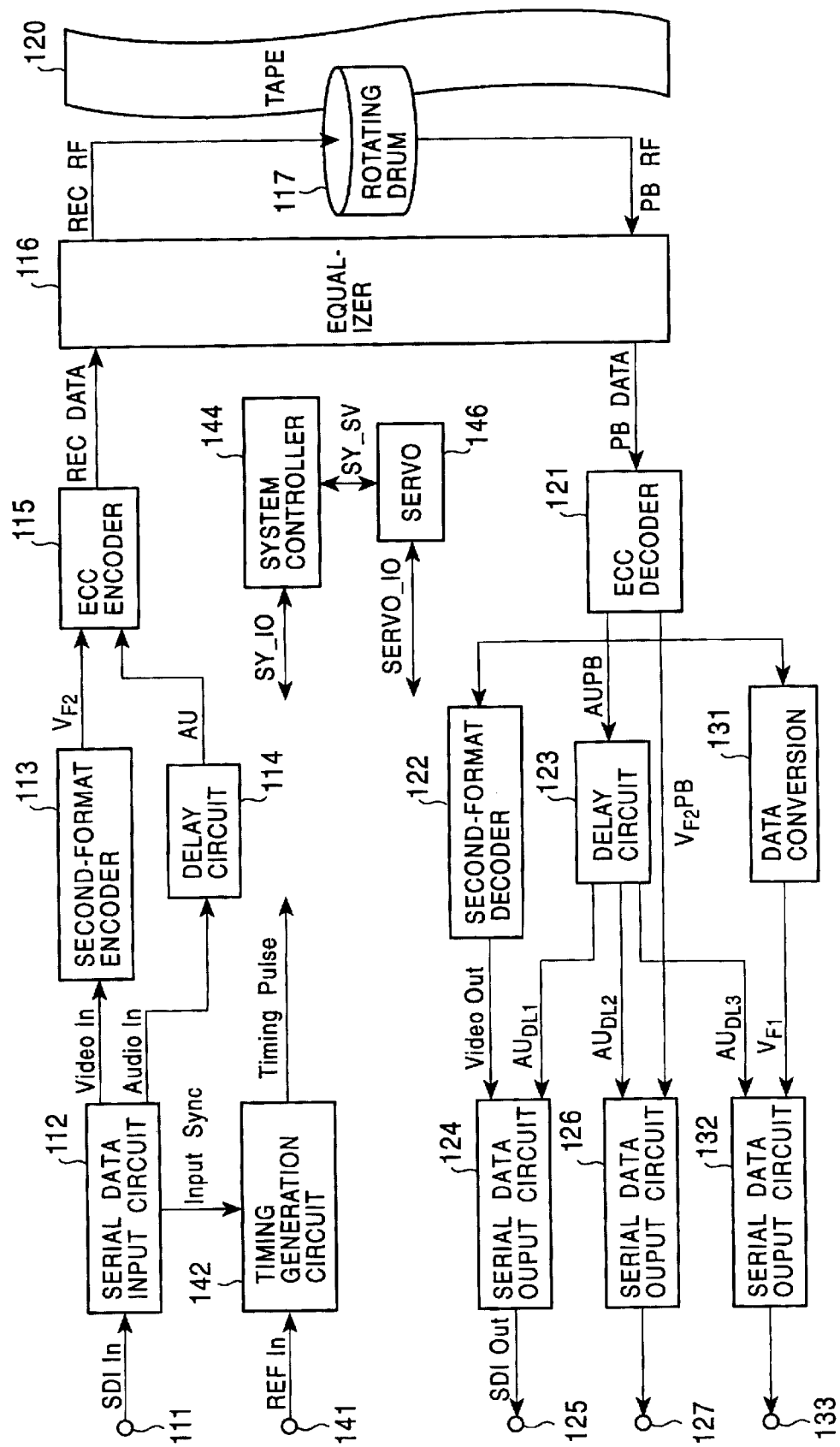
FIG. 10 is a diagram of a signal recording and reproduction apparatus according to an embodiment of the present invention.

In FIG. 10, a serial data signal SDI In which may be a multiplexed digital video and digital audio signal is supplied through an input terminal 111 to a serial data input circuit 112. The serial data input circuit 112 converts the input serial signal SDI In to a parallel signal, separates the converted parallel signal into a video signal and an audio signal, supplies the video signal Video In to a second-format encoder 113, and supplies the audio signal Audio In to a delay circuit 114. The serial data input circuit 112 also supplies a signal Input Sync serving as the phase reference of the input signal SDI In to a timing generation circuit 142.

The timing generation circuit 142 outputs timing signals utilized as timing pulses to other circuits in synchronization with a specified signal, such as either a reference synchronization signal extracted from an external reference signal REF In supplied to an input terminal 141 or the signal Input Sync received from the serial data input circuit 112.

The second-format encoder 113 applies encoding to the received video signal Video In to perform data compression so as to form a second-format video signal VF2 and supplies the same to an ECC (error correction code) encoder 115. Since an audio signal is handled as non-compression data in the video tape recorder of this example, the delay circuit 114 delays the received audio signal Audio In by an amount corresponding to the processing time of the second-format encoder 113 and supplies the obtained delayed signal as non-compressed audio signal AU to the ECC encoder 115.

The ECC encoder 115 applies error correction encoding processing to the received compressed video signal $VF_2$ and non-compressed audio data AU to form recording data REC DATA and supplies the same to an equalizer 116. The equalizer 116 converts the received recording data REC DAT to a recording RF signal REC RF and supplies the same to a rotating head of a rotating drum 117. The recording head of the rotating drum 117 records the recording RF signal REC RF in a slanted helical track or tracks on a tape 120.

In reproduction, a reproduction head of the rotating drum 117 reproduces a reproduction RF signal PB RF from the tape 120 and supplies the same to the equalizer 116. The equalizer 116 applies phase equalization processing to the received reproduction RF signal PB RF so as to obtain reproduction data PB DATA and supplies the same to an ECC decoder 121.

The ECC decoder 121 applies error correction decoding processing to the received reproduction data PB DATA to obtain a reproduction video signal $V_{F2}$PB having the second format to which compression encoding has been applied, and a non-compression reproduction audio signal AUPB. The ECC decoder 121 supplies the reproduction video signal $V_{F2}$PB to a second-format decoder 122, a serial data output circuit 126, and a data conversion circuit 131 corresponding to the data conversion apparatus previously described; and supplies the reproduction audio signal AUPB to a delay circuit 123.

The second-format decoder 122 decodes the received reproduction video signal VF2PB to obtain the original video signal (which is not compressed) and supplies the same as an output video signal Video Out to a serial data output circuit 124.

The delay circuit 123 delays the received reproduction audio signal AUPB by an amount of time corresponding to timing adjustment of the video signals. Output signals $AU_{DL1}$, $AU_{DL2}$, and $AU_{DL3}$ delayed according to the corresponding video signals are supplied to the serial data output circuits 124, 126, and 132, respectively.

The serial data output circuit 124 converts the video signal Video Out and the audio signal $AU_{DL1}$ (which have corresponding timings) from parallel signals to serial signals and supplies a serial data signal SDI Out having a predetermined serial data transfer format to an output terminal 125.

The serial data output circuit 126 converts the audio signal $AU_{DL2}$ and the reproduction video signal $V_{F2}$PB having the second format received from the ECC decoder 121 (which have corresponding timings) from parallel signals to serial signals and supplies a serial data signal having a predetermined serial data transfer format to an output terminal 127.

A data conversion apparatus such as that shown in FIG. 1 may be used as the data conversion circuit 131. The data conversion circuit 131 converts the received reproduction video signal $V_{F2}$PB having the second format to a video signal $V_{F1}$ having the first format (MPEG) and supplies the same to the serial data output circuit 132.

The serial data output circuit 132 converts the received audio signal $AU_{DL3}$ and video signal $V_{F1}$ having the first format (which have corresponding timings) from parallel signals to serial signals and supplies a serial data signal having a predetermined serial data transfer format to an output terminal 133. The signal supplied from the output terminal 133 is a serial data signal having a standard MPEG stream which may be forwarded to an external MPEG unit.

A system controller 144 communicates with other circuits by SY_10 and SERVO_10 signals in cooperation with a servo circuit 146 by an SY_SV signal to control the digital VTR or apparatus of FIG. 1.

Although the above-mentioned MPEG standard is a reference standard of a digital video signal, it may not be used in a professional broadcasting VTR (video tape recorder). That is, an editing function is normally important in a professional broadcasting VTR and, as such, the quality of an image(s) in a search mode used for searching for a portion to be edited may be an important factor. Since recording data is recorded as helical track patterns on a tape with the use of a head on a rotating drum in a VTR, all recorded data may not be reproduced during high-speed reproduction such as a search mode. In MPEG (serving as the first format), DCT coefficients may be arranged independently in each of eight DCT blocks (Y0 to Y3 and Cb0 to Cr1 in FIG. 3) in a macroblock and may be recorded by a VTR in this arrangement order. As a result, the DC coefficients and low-order AC coefficients important for decoding the macroblock so as to provide an acceptable reproduced image may not be obtained for all eight blocks and, as such, a high-quality search image may not be obtained.

On the other hand, in the second format, DCT coefficients may be sequentially arranged in units of macroblocks having an order of DC coefficients of eight DCT blocks and AC coefficients from a low order to a high-order in units of eight coefficients. With the use of this arrangement, DC coefficients and lower-order AC coefficients may be collectively taken out or reproduced in a macroblock during high-speed reproduction (such as in a search mode operation). As a result, the image obtained upon decoding the macroblock may be acceptable. Additionally, the second format may use the same compression level algorithm as MPEG which is a standard and is acceptable for functions performed by a professional broadcasting VTR.

Since the second format may be utilized in a professional broadcasting VTR, using the MPEG standard as the first format is acceptable in terms of data communication with other units.

Compression-encoded data having the second format may be decoded to obtain the original video data (which is not compressed) and then compression encoding with the first format may be applied to the data. To perform such processing, a relatively large circuit and a relatively large amount of processing may be required.

In processing data having the second format so as to obtain data having the first format with the present invention, MPEG decoding operations (such as inverse DCT processing and inverse quantization processing) may not be performed. As a result, by not performing such MPEG decoding operations, image degradation may be eliminated or minimized such that an image or images having a relatively high quality may be provided.

Alternatively, partial decoding up to variable-length decoding may be applied to encoded data having the second format to obtain DCT coefficients, the DCT coefficients may be re-arranged according to the first format without decoding, and partial encoding may be applied only with variable-length encoding to obtain an encoded data stream in MPEG or the first format. With this method, encoded data having the second format may be converted to encoded data having the first format with the use of a relatively simple circuit and a relatively small amount of processing.

Further, by arranging the data conversion section in a VTR, decoding of encoded data having the second format and encoding to obtain encoded data in the first format may be unnecessary for data transfer between the VTR and an external MPEG unit. Additionally, an interface which causes little or no deterioration in image quality may be obtainable.

The present invention is not limited to the specific features described above. For example, in the present invention, the first format is not limited to MPEG, and the second format is not limited to that described above. Additionally, it is easy to convert encoded data having the first format to encoded data having the second format. In this situation, a data conversion apparatus should include a decoder (such as variable-length decoder) for decoding encoded data having the first format so as to obtain orthogonal transform coefficients (such as DCT coefficients); a conversion device for re-arranging the orthogonal transform coefficients obtained by the decoder to units of block assembly members (such as macroblocks) in the first format in the order of DC components and AC components from a low order to a high order; and an encoder (such as a variable-length encoder) for encoding the orthogonal transform coefficients from the conversion device to form encoded data having the second format.

According to the present invention, in performing data conversion between first-format encoded data in which orthogonal transform coefficients are arranged in the order of DC components and AC components from a low spatial frequency order to a high spatial frequency order in each orthogonal transform block when compression encoding which includes orthogonal transformation is applied to video data and second-format encoded data in which orthogonal transform coefficients are arranged in the order of DC components and AC components from a low spatial frequency order to a high spatial frequency order in each block assembly member formed of a plurality of orthogonal transform blocks in the manner previously described when compression encoding which includes orthogonal transformation is applied to video data, the second-format encoded data may be decoded to obtain the orthogonal transform coefficients; the obtained orthogonal transform coefficients may be re-arranged to the order of DC components and AC components from a low spatial frequency order to a high spatial frequency order in each orthogonal transform block of the first format; and the re-arranged orthogonal transform coefficients may be encoded to form encoded data having the first format. With these operations, encoded data having the second format (which may be suitable for VTR recording) can be converted to encoded data having the first format such as an MPEG standard (which is a compression encoding standard of a digital video signal) by use of a relatively simple circuit and a relatively small amount of processing.

Although preferred embodiments of the present invention and modifications thereof have been described in detail herein, it is to be understood that this invention is not limited to these embodiments and modifications, and that other modifications and variations may be effected by one skilled in the art without departing from the spirit and scope of the invention as defined by the appended claims.

What is claimed is:

1. A data conversion apparatus for performing data conversion between first-format encoded data in which orthogonal transform coefficients are arranged in an order of DC components and AC components from a low spatial frequency order to a high spatial frequency order in each orthogonal transform block when compression encoding which includes orthogonal transform is applied to video data and second-format encoded data in which orthogonal transform coefficients are arranged in an order of DC components and AC components from a low spatial frequency order to a high spatial frequency order in each block assembly member formed of a plurality of orthogonal transform blocks when compression encoding which includes orthogonal transform is applied to video data, said data conversion apparatus comprising:

decoding means for decoding the second-format encoded data to obtain orthogonal transform coefficients;

conversion means for re-arranging the orthogonal transform coefficients of the second-format data obtained by said decoding means in the order of the DC components and AC components from a low spatial frequency order to a high spatial frequency order in each orthogonal transform block of the first format; and encoding means for encoding the orthogonal transform coefficients from said conversion means to form encoded data having the first format, wherein data of the first format includes a plurality of macroblocks having a plurality of luminance blocks and chrominance blocks, and wherein the DC components and AC components in each luminance block and in each chrominance block are arranged from the low spatial frequency order to the high spatial frequency order.

2. A data conversion apparatus according to claim 1, wherein the orthogonal transform is discrete cosine transform (DCT), the orthogonal transform block is a DCT block, and the block assembly member is a macroblock.

3. A data conversion apparatus according to claim 1, wherein said decoding means includes variable-length decoding means, and said encoding means includes variable-length encoding means.

4. A data conversion apparatus according to claim 1, further comprising header addition means for adding header information to the encoded data from said encoding means.

5. A data conversion method for performing data conversion between first-format encoded data in which orthogonal transform coefficients are arranged in an order of DC components and AC components from a low spatial frequency order to a high spatial frequency order in each orthogonal transform block when compression encoding which includes orthogonal transform is applied to video data and second-format encoded data in which orthogonal transform coefficients are arranged in an order of DC components and AC components from a low spatial frequency order to a high spatial frequency order in each block assembly member formed of a plurality of orthogonal transform blocks when compression encoding which includes orthogonal transform is applied to video data, said data conversion method comprising the steps of:

decoding the second-format encoded data to obtain orthogonal transform coefficients;

re-arranging the orthogonal transform coefficients of the second-format data obtained in the decoding step in the order of the DC components and AC components from a low spatial frequency order to a high spatial frequency order in each orthogonal transform block of the first format; and encoding the orthogonal transform coefficients obtained in the re-arranging step to form encoded data having the first format, wherein data of the first format includes a plurality of macroblocks having a plurality of luminance blocks and chrominance blocks, and wherein the DC components and AC components in each luminance block and in each chrominance block are arranged from the low spatial frequency order to the high spatial frequency order.

6. A signal recording and reproduction apparatus for recording and reproducing into and from a recording medium encoded data having a second format in which orthogonal transform coefficients are arranged in an order of DC components and AC components from a low spatial frequency order to a high spatial frequency order in each block assembly member formed of a plurality of orthogonal transform blocks when compression encoding which includes orthogonal transform is applied to video data, said signal recording and reproduction apparatus comprising:

decoding means for decoding the encoded data having the second format reproduced from the recording medium to obtain the orthogonal transform coefficients;

conversion means for re-arranging the orthogonal transform coefficients of the second-format data obtained by said decoding means to the coefficient arrangement order of a first format in which the coefficients are arranged in the order of the DC components and AC components from a low spatial frequency order to a high spatial frequency order in each orthogonal transform block; and encoding means for encoding the orthogonal transform coefficients from said conversion means to form encoded data having the first format, wherein data of the first format includes a plurality of macroblocks having a plurality of luminance blocks and chrominance blocks, and wherein the DC components and AC components in each luminance block and in each chrominance block are arranged from the low spatial frequency order to the high spatial frequency order.

7. A stream processing apparatus for processing a second format encoded stream to generate a first format encoded stream, the apparatus comprising:

processing means for processing discrete cosine transform (DCT) coefficients included in a macroblock layer of said second format encoded stream and for re-arranging an order of said DCT coefficients of said macroblock layer to a predetermined order corresponding to said first format encoded stream so as to form said first format encoded stream from said second format encoded stream; and control means for controlling said processing means so that said second format encoded stream is converted to said first format encoded stream without performing a MPEG decoding process on said second format encoded stream, wherein data of the first format includes a plurality of macroblocks having a plurality of luminance blocks and chrominance blocks, and wherein the DCT coefficients in each luminance block and in each chrominance block are arranged from a low spatial frequency order to a high spatial frequency order.

8. The stream processing apparatus according claim 7, wherein said DCT coefficients of said second format encoded stream are arranged in a spatial frequency order, and said DCT coefficients of said first format encoded stream are arranged in an order of DCT blocks.

9. The stream processing apparatus according claim 8, wherein said control means controls a type of scanning type assigned to said macroblocks included in a picture of said first format encoded stream such that said scanning is selected from a plurality of scanning types which had been assigned to the macroblocks in said second format encoded stream.

10. The stream processing apparatus according claim 8, wherein said processing means includes variable-length decoding means for variable-length decoding said DCT coefficients included in the macroblock layer of said second format encoded stream, re-arranging means for re-arranging an order of said DCT coefficients variable-length decoded by said variable-length decoding means from the spatial frequency order to the order of DCT blocks, and variable-length encoding means for variable-length encoding said DCT coefficients re-arranged by said re-arranging means.

11. The stream processing apparatus according claim 10, wherein said re-arranging means stores said DCT coefficients included in said second format encoded stream into a memory in a first direction and reads out said stored DCT coefficients from said memory in a second direction.

12. The stream processing apparatus according claim 10, wherein said processing means further includes header adding means for adding header information corresponding to said first format encoded stream, and means operative for performing at least one of stuffing dummy bits into said first format encoded stream to increase an amount of bits of said first format encoded stream, and controlling a value of a respective DCT coefficient which is the highest spatial frequency coefficient among non-zero DCT coefficients to decrease the amount of bits of first format encoded stream.

13. A stream processing method for processing a second format encoded stream to generate a first format encoded stream, the method comprising the steps of:

processing discrete cosine transform (DCT) coefficients included in a macroblock layer of said second format encoded stream and re-arranging an order of said DCT coefficients of said macroblock layer to a predetermined order corresponding to said first format encoded stream so as to form said first format encoded stream from said second format encoded stream; and controlling the processing step so that said second format encoded stream is converted to said first format encoded stream without performing a MPEG decoding process on said second format encoded stream wherein data of the first format includes a plurality of macroblocks having a plurality of luminance blocks and chrominance blocks, and wherein the DCT coefficients in each luminance block and in each chrominance block are arranged from a low spatial frequency order to a high spatial frequency order.

14. The stream processing method according claim 13, wherein said DCT coefficients of said second format encoded stream are arranged in a spatial frequency order, and said DCT coefficients of said first format encoded stream are arranged in an order of DCT blocks.

15. The stream processing method according claim 14, wherein the controlling step controls a type of scanning type assigned to said macroblocks included in a picture of said first format encoded stream such that said scanning is selected from a plurality of scanning types which had been assigned to the macroblocks in said second format encoded stream.

16. The stream processing method according claim 14, wherein the processing step includes variable-length decoding said DCT coefficients included in the macroblock layer of said second format encoded stream, re-arranging an order of the variable-length decoded DCT coefficients from the spatial frequency order to the order of DCT blocks, and variable-length encoding the re-arranged DCT coefficients.

17. The stream processing method according claim 16, wherein the re-arranging step stores said DCT coefficients included in said second format encoded stream into a memory in a first direction and reads out said stored DCT coefficients from said memory in a second direction.

18. The stream processing method according claim 16, wherein the processing step further includes adding header information corresponding to said first format encoded stream, and performing at least one of stuffing dummy bits into said first format encoded stream to increase an amount of bits of said first format encoded stream, and controlling a value of a respective DCT coefficient which is the highest spatial frequency coefficient among non-zero DCT coefficients to decrease the amount of bits of first format encoded stream.

* * * * *